United States Patent
Cheng et al.

(10) Patent No.: US 10,014,779 B2
(45) Date of Patent: Jul. 3, 2018

(54) POWER SUPPLY DEVICE

(71) Applicant: ASUSTeK COMPUTER INC., Taipei (TW)

(72) Inventors: Hao-Chien Cheng, Taipei (TW); Ching-Fu Cheng, Taipei (TW); Hsiao-Wen Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/367,161

(22) Filed: Dec. 1, 2016

(65) Prior Publication Data
US 2017/0179827 A1 Jun. 22, 2017

(30) Foreign Application Priority Data
Dec. 17, 2015 (TW) .............................. 104142519 A

(51) Int. Cl.
*G05F 1/00* (2006.01)
*H02M 3/158* (2006.01)
*H02M 1/32* (2007.01)

(52) U.S. Cl.
CPC ............ *H02M 3/1584* (2013.01); *H02M 1/32* (2013.01); *H02M 3/1588* (2013.01); *Y02B 70/1466* (2013.01)

(58) Field of Classification Search
CPC ............ G05F 1/563; G05F 1/61; G05F 1/614; H02M 2001/0045; H02M 2001/007; H02M 3/3374; H02M 3/1584; H02M 2003/1586; H02M 3/156; H02M 3/1563; H02M 3/158
See application file for complete search history.

(56) References Cited

U.S. PATENT DOCUMENTS

| 7,254,000 | B1 | 8/2007 | Smith et al. |
| 7,737,672 | B2* | 6/2010 | Kudo ................. H02M 3/1584 323/271 |
| 8,106,640 | B2* | 1/2012 | Itakura .................... H02M 1/32 323/272 |
| 9,343,901 | B2 | 5/2016 | Kuo et al. |
| 9,350,158 | B2 | 5/2016 | Chen et al. |
| 2012/0262139 | A1* | 10/2012 | Moussaoui ............. H02M 1/44 323/282 |

FOREIGN PATENT DOCUMENTS

| TW | M419967 U | 1/2012 |
| TW | 201448395 A | 12/2014 |
| TW | 201539958 A | 10/2015 |

* cited by examiner

*Primary Examiner* — Nguyen Tran
(74) *Attorney, Agent, or Firm* — CKC & Partners Co., Ltd.

(57) ABSTRACT

A power supply device includes a power supply module, a voltage regulator module and an over-voltage protection (OVP) module. The power supply module is utilized to provide a standby voltage signal. The voltage regulator module includes a phase modulator circuit. The phase modulator circuit includes a high-side power transistor, a low-side power transistor and a phase inductor. The OVP module is utilized to transmit the standby voltage signal to the phase modulator circuit and detect a detection potential on the phase modulator circuit. The OVP module selectively conducts the low-side power transistor of the phase modulator circuit according to the detection potential.

9 Claims, 7 Drawing Sheets

POWER SUPPLY DEVICE

CROSS-REFERENCE TO RELATED APPLICATION

This application claims the priority benefit of Taiwan application serial No. 104142519, filed on Dec. 17, 2015. The entirety of the above-mentioned patent applications is hereby incorporated by reference herein and made a part of specification.

BACKGROUND OF THE INVENTION

Field of the Invention

The disclosure relates to a power supply device and, more particularly, to a power supply device with an over-voltage protection.

Description of the Related Art

In general, an electronic device is supplied power by a power supply or is charged by a power adapter. However, an unstable power input may damage significant components of the electronic device during supplying power or charging.

For example, a central processing unit of an electronic device requires a high precision input power specification. If a surge voltage supplied to the central processing unit is larger than the maximum withstanding voltage, or an instantaneous current supplied to the central processing unit is larger than the maximum current, the central processing unit may be damaged or burnt.

BRIEF SUMMARY OF THE INVENTION

A power supply device is provided. The power supply device includes a power supply module used to provide a standby voltage, a voltage regulator module coupled to the power supply module and an over-voltage protection module. The voltage regulator module includes a phase modulator circuit. The phase modulator circuit includes a high-side power transistor, a low-side power transistor and an inductor. An input terminal of the inductor is coupled to the high-side power transistor and the low-side power transistor, respectively, and an output terminal of the inductor is coupled to a load. The over-voltage protection module is coupled to the power supply module and the voltage regulator module. The over-voltage protection module transmits the standby voltage to the phase modulator circuit and detects a detection potential of the inductor, and the low-side power transistor of the phase modulator circuit is selectively conducted by the over-voltage protection module according to the detection potential.

The over-voltage protection module takes the over-voltage protection (OVP) after the standby voltage Vstb is established and before the voltage control signal EN is enabled. In other words, the over-voltage protection is provided during the initial startup procedure of the power supply device.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

The terms "connected" or "coupled" can represent that "electrically connected" or "electrically coupled", and the terms "connected" or "coupled" may represent that two or more components operate or act with each other, which is not limited herein. "The first", "the second" and so on, except expressly stated, are not used to limit in the order in the disclosure, and they are only used to distinguish components or operations with same terms.

Figure 1:
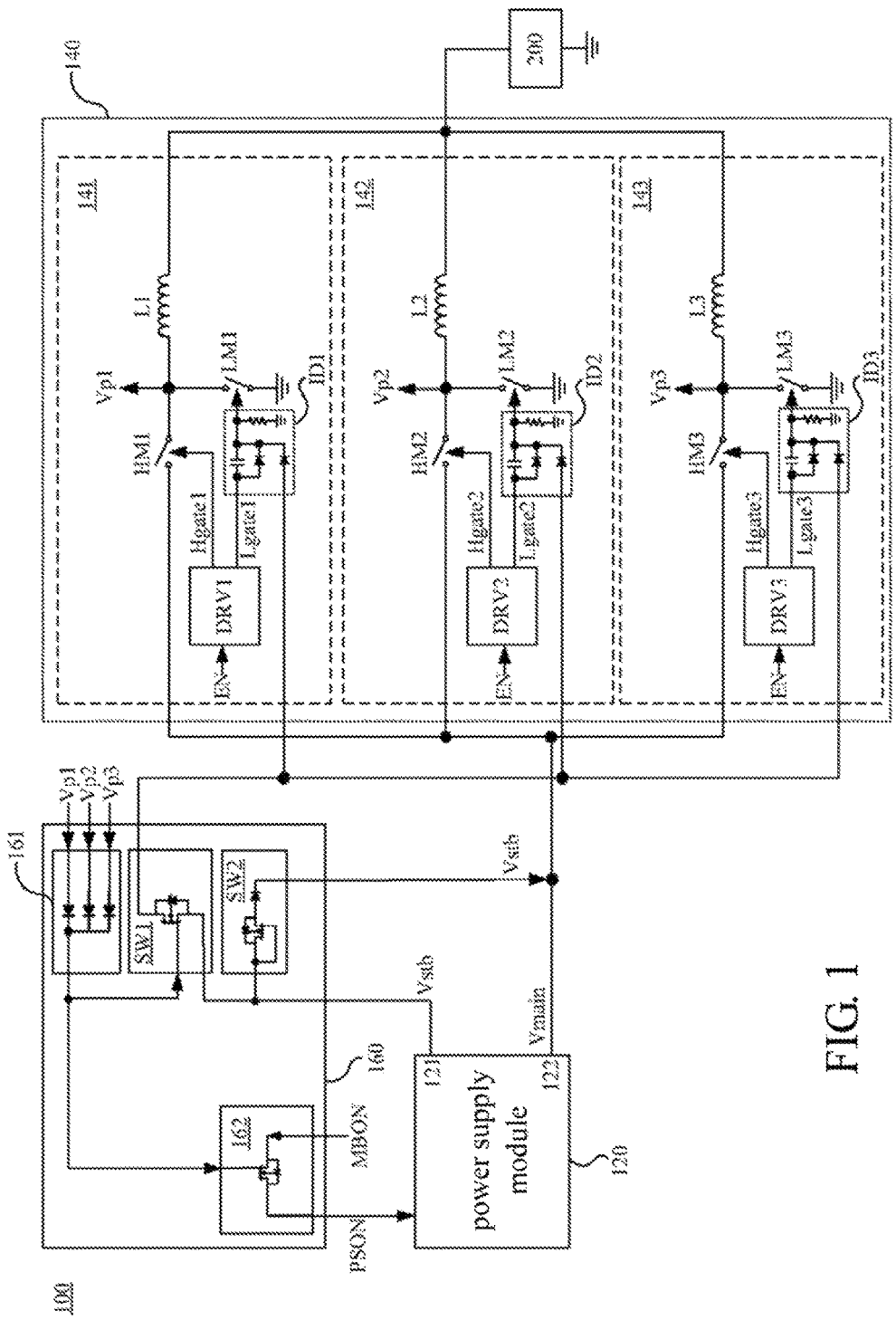
FIG. 1 is a schematic diagram showing a power supply device in an embodiment.

Please refer to FIG. 1, which is a schematic diagram showing a power supply device 100 in an embodiment. As shown in FIG. 1, the power supply device 100 is used to supply power to a load 200 or charge the load 200.

In an embodiment, the load 200 is a central processing unit (CPU), a processing unit or an electronic load, which is not limited herein. The power supply device 100 is used to supply power to the load 200. The power supply device 100 is a power supply unit (PSU) or a power adapter, which is not limited herein. The power supplied to the CPU is a stable input voltage (such as 5V±5%, 3.75V±5%) or current to avoid damage of the CPU.

In the embodiment, the power supply device 100 is utilized to provide stable power, and the power supply device 100 includes protection mechanism to protect the load 200 during the initial startup procedure. As shown in FIG. 1, the power supply device 100 includes a power supply module 120, a voltage regulator module 140 and an over-voltage protection module 160.

Figure 2:
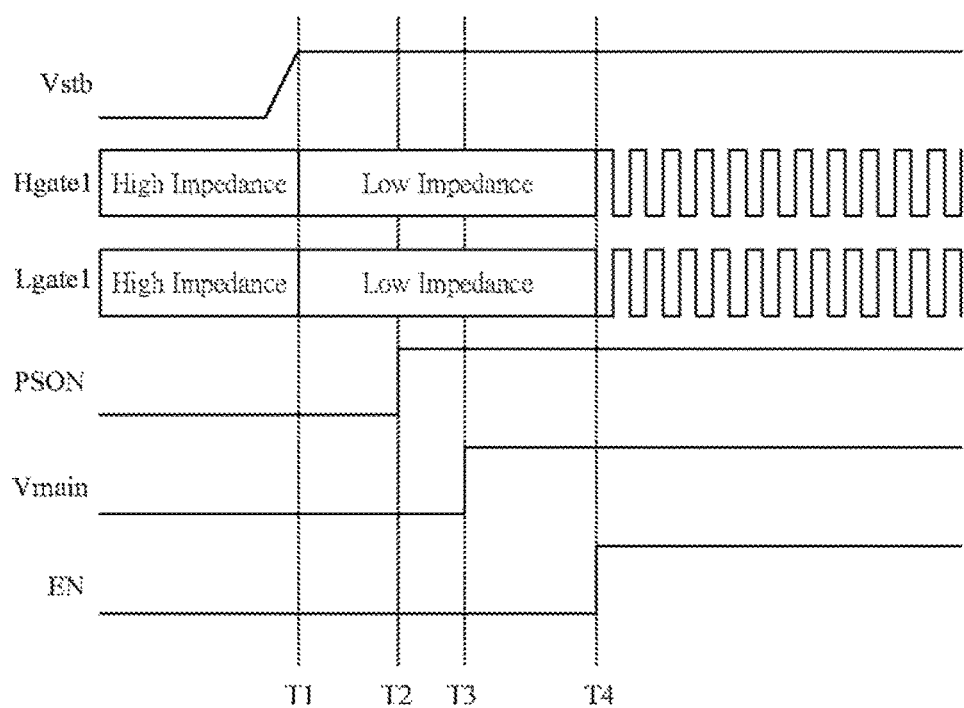
FIG. 2 is a sequence diagram showing signals of a power supply device in a normal condition in an embodiment.

The power supply module 120 includes a standby voltage terminal 121 and a main voltage terminal 122. The power supply module 120 is utilized to supply various voltages. In the embodiment, the power supply module 120 selectively supplies a standby voltage Vstb (through the standby voltage terminal 121) and a main voltage Vmain (through the main voltage terminal 122) according to the operation state. In an embodiment, the standby voltage Vstb provided by the power supply module 120 is +5V, and the main voltage Vmain is +12V. Please refer to FIG. 1 and FIG. 2. FIG. 2 is a sequence diagram showing signals of the power supply device 100 in a normal condition in an embodiment.

As shown in FIG. 2, when the power supply device 100 initially starts (in an embodiment, when the socket is connected to power supply device 100, the battery is connected to the power supply device 100, or the main switch is turned on), the setting of the standby voltage Vstb is finished at the time point T1. As the standby voltage Vstb is set, a motherboard switch signal MBON is switched to a high potential in an embodiment. A power on signal PSON is enabled at the time point T2 with the motherboard switch signal MBON, and then the power supply module 120 provides the main voltage Vmain at the time point T3 according to the enabled power on signal PSON.

As shown in FIG. 1, the voltage regulator module 140 is coupled between the main voltage terminal 122 and the load 200. The voltage regulator module 140 is utilized to convert the main voltage Vmain to a special voltage required for the load 200. In an embodiment, the voltage regulator module 140 is a buck convertor, which is utilized to convert the main voltage Vmain of +12V to a three-phase output voltage of 3.75V, and the three-phase output voltage is provided to the load 200, which is not limited herein.

The voltage regulator module 140 includes at least a phase modulator circuit. In the embodiment, the voltage regulator module 140 includes three phase modulator circuits, that is, a first phase modulator circuit 141, a second phase modulator circuit 142 and a third phase modulator circuit 143. The first phase modulator circuit 141, the second phase modulator circuit 142 and the third phase modulator circuit 143 include high-side power transistors HM1~HM3, low-side power transistors LM1~LM3 and inductors L1~L3, respectively. In an embodiment, the voltage regulator module 140 is not limited to three-phase modulator circuits.

As to the first phase modulator circuit 141, the second phase modulator circuit 142 and the third phase modulator circuit 143, the input terminals of the inductors L1~L3 are coupled to one of the high-side power transistors HM1~HM3 and one of the low-side power transistors LM1~LM3, respectively. In an embodiment, the inductor L1 of the first phase modulator circuit 141 is coupled to the high-side power transistor HM1 and the low-side power transistor LM1, and so on. The output terminals of the inductors L1~L3 are coupled to the load 200.

As to the first phase modulator circuit 141, the second phase modulator circuit 142 and the third phase modulator circuit 143, the high-side power transistors HM1~HM3 include a first terminal and a second terminal, respectively. The first terminal of the high-side power transistors HM1~HM3 is coupled to the main voltage terminal 122 of the power supply module 140, and the second terminal of the high-side power transistors HM1~HM3 is coupled to the input terminal of the inductors L1~L3, respectively.

The low-side power transistors LM1~LM3 include a first terminal and a second terminal, respectively. The first terminal of the low-side power transistors LM1~LM3 is coupled to the second terminal of the high-side power transistors HM1~HM3 and the input terminal of the inductors L1~L3, respectively. The second terminal of the low-side power transistors LM1~LM3 is coupled to the ground terminal, respectively.

In an embodiment, the first phase modulator circuit 141, the second phase modulator circuit 142 and the third phase modulator circuit 143 include switch drivers DRV1~DRV3, respectively. The switch drivers DRV1~DRV3 generate high-side gate signals Hgate1~Hgate3 to the high-side power transistors HM1~HM3 and generate low-side gate signals Lgate1~Lgate3 to the low-side power transistors LM1~LM3 according to whether the voltage control signal EN is enabled. As a result, the three phase high-side power transistors and the low-side power transistors are switched sequentially. The high-side gate signal and the low-side gate signal of the same phase modulator circuit are exclusive (the high-side gate signal Hgate1 and the low-side gate signal Lgate1 are reverse signals to each other after the time point T4 as shown in FIG. 2).

In an embodiment, the switch drivers DRV1~DRV3 determine to generate the high-side gate signals Hgate1~Hgate3 and the low-side gate signals Lgate1~Lgate3 according to whether the voltage control signal EN is enabled. As shown in FIG. 2, during the initial startup procedure of the power supply device 100, the standby voltage Vstb is established firstly, then, the power on signal PSON is enabled, and then the main voltage Vmain is established. From the time point T4, the voltage control signal EN is enabled, and then the switch drivers DRV1~DRV3 generate the high-side gate signals Hgate1~Hgate3 and the low-side gate signals Lgate1~Lgate3. From the time point T4, the output voltage Vo is provided to the load 200 after the main voltage Vmain passes through the voltage regulator module 140.

As shown in FIG. 1, in an embodiment, the over-voltage protection module 160 further includes a detection circuit 161, a signal generating unit 162, a first switch SW1 and a second switch SW2.

The signal generating unit 162 is utilized to generate a power on signal PSON to the power supply module 120. The signal generating unit 162 generates the power on signal PSON according to an external input (for example, the main switch is switched or the motherboard switch signal MBON is inputted from outside). The power supply module 120 supplies the main voltage Vmain to the voltage regulator module 140 according to whether the power on signal PSON is enabled.

The detection circuit 161 is utilized to detect detection potentials Vp1~Vp3 of the inductors L1~L3, respectively. In the embodiment, the detection potentials Vp1~Vp3 are the potentials of the input terminals of the inductors L1~L3, which is not limited herein. In an embodiment, a dropout voltage of inductors L1~L3 or the voltage potentials of the output terminals of inductors L1~L3 are detected.

The second switch SW2 is coupled to the standby voltage terminal 121 of the power supply module 120 and the first terminals of the high-side power transistors HM1~HM3. As shown in FIG. 2, between the time point T1 and the time point T3, after the standby voltage Vstb is established, the standby voltage Vstb is transmitted to the first terminals of the high-side power transistors HM1~HM3 via the second switch SW2, and the standby voltage Vstb detects whether the high-side power transistors HM1~HM3 are short circuited or in the floating state.

Normally, before the time point T4, the switch drivers DRV1~DRV3 do not output any gate control signals to the high-side power transistors HM1~HM3 and the low-side gate signals Lgate1~Lgate3, the gate potential is in a high impedance or in a low impedance, and thus the high-side power transistors HM1~HM3 and the low-side gate signals Lgate1~Lgate3 are turned off. Consequently, the detection potentials Vp1~Vp3 are ground potential normally.

Figure 3:
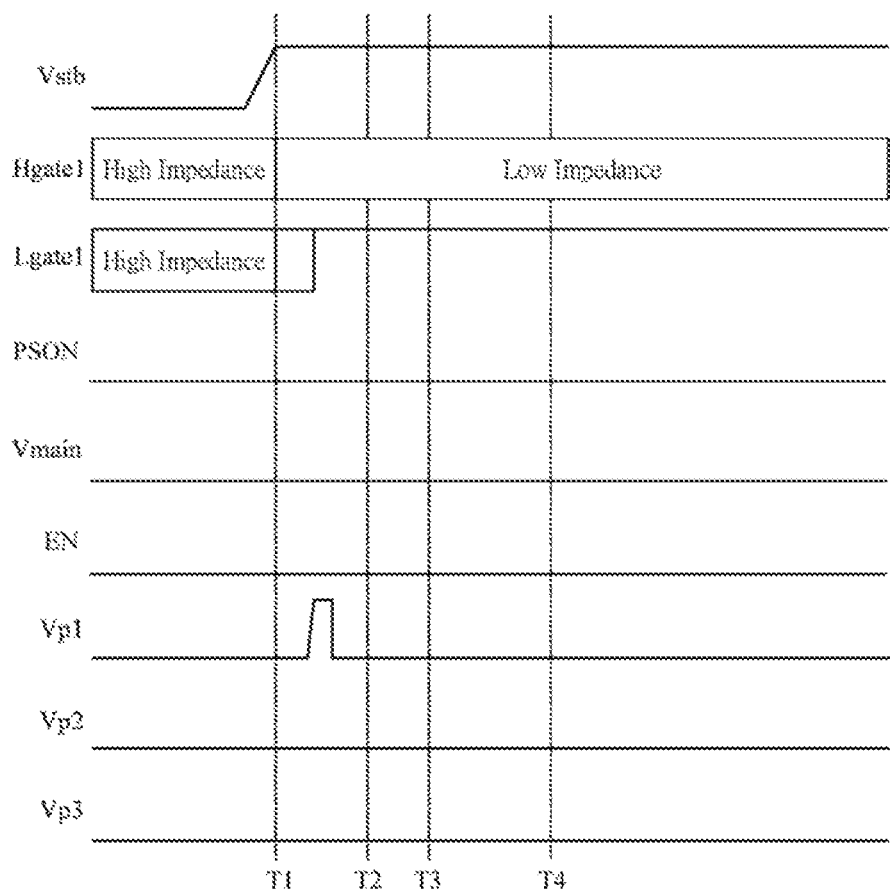
FIG. 3 is a sequence diagram showing signals when one of the high-side power transistors is short circuited to be conducted between specific time points in an embodiment.

Please refer to FIG. 3, between the time point T1 and the time point T3, when one of high-side power transistors HM1~HM3 is short circuited, the standby voltage Vstb passes through one of the high-side power transistors HM1~HM3 and forms high detection potentials (about equal to the potential of the standby voltage Vstb) at the corresponding one of the inductors L1~L3.

Similarly, between the time point T1 and the time point T3, when one gate of the high-side power transistors HM1~HM3 is in a floating state, the standby voltage Vstb of the first terminal of the high-side power transistors HM1~HM3 makes the high-side power transistors HM1~HM3 conducted via a coupling effect of a stray capacitance. That means, the standby voltage Vstb passes through one of the high-side power transistors HM1~HM3 and forms the high detection potentials Vp1~Vp3 on the corresponding one of the inductors L1~L3.

Between the time point T1 and the time point T3, when one of the detection potentials Vp1~Vp3 detected by the detection circuit 161 is not the grounding voltage (or exceeds the corresponding over-voltage protection potential), that means, at least one of high-side power transistors HM1~HM3 is short circuited or in the floating state. The signal generating unit 162 disables the power on signal PSON, the enablement of the power supply device 100 is interrupted, and then the power supply module 120 stops the subsequent processes.

As shown in FIG. 1, the isolation drivers ID1~ID3 are coupled to the switch drivers DRV1~DRV3 and the low-side power transistors LM1~LM3, respectively. When one of the detection potentials Vp1~Vp1 is not the grounding voltage (or exceeds the corresponding over-voltage protection potential), the first switch SW1 enables all the isolation drivers ID1~ID3. Consequently, the three phase isolation drivers ID1~ID3 conduct the three phase low-side power transistors LM1, LM2 and LM3 at the same time.

Please refer to FIG. 3. FIG. 3 is a sequence diagram showing signals when one of high-side power transistors is abnormal between the time point T1 and the time point T3. As shown in FIG. 3, the detection circuit 161 detects that the detection potential Vp1 is in the transient high potential, that means, the high-side power transistor HM1 is short circuited or in the floating state. At this time, the signal generating unit 162 disables the power on signal PSON, the first switch SW1 enables the isolation drivers ID1~ID3 simultaneously, and then the three phase low-side power transistors LM1, LM2 and LM3 are conducted and grounded.

Therefore, the over-voltage protection module 160 transmits the standby voltage Vstb to the first phase modulator circuit 141, the second phase modulator circuit 142 and the third phase modulator circuit 143, and detects the detection potentials Vp1~Vp3 of the inductors L1~L3. The over-voltage protection module 160 selectively conducts the low-side power transistors LM1~LM3 of the first phase modulator circuit 141, the second phase modulator circuit 142 and the third phase modulator circuit 143 according to the detection potentials Vp1~Vp3.

Figure 4:
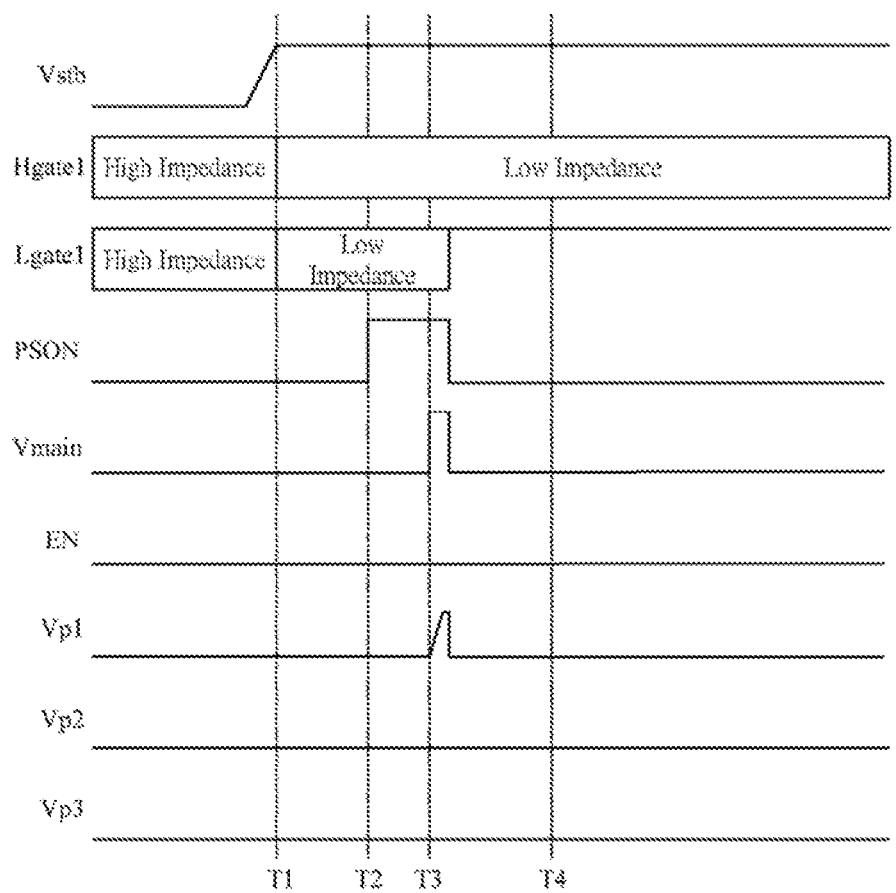
FIG. 4 is a sequence diagram showing signals when one of the high-side power transistors is short circuited to be conducted between specific time points in an embodiment.

Please refer to FIG. 4. FIG. 4 is a sequence diagram of signals when one of high-side power transistors is abnormal between the time point T3 and the time point T4. After the time point T3, the power supply module 120 starts to supply the main voltage Vmain, the potential of the main voltage Vmain is increased, and then the increased main voltage Vmain is transmitted to the first terminal of the high-side power transistors HM1~HM3, respectively. At this time, the second switch SW2 can be turned off to stop transmit the standby voltage Vstb to the first terminal of the high-side power transistors HM1~HM3. When one of the high-side power transistors HM1~HM3 is abnormal (for example, the high-side power transistors HM1~HM3 are short circuited or in the floating state), assume that the high-side power transistor HM1 is abnormal in FIG. 4, the main voltage Vmain passes through the high-side power transistor HM1 to make the detection potential Vp1 in the transient high potential. At this time, the signal generating unit 162 disables the power on signal PSON, the first switch SW1 enables the isolation drivers ID1~1D3, and then the three phase low-side power transistors LM1, LM2 and LM3 are conducted and grounded.

Figure 5:
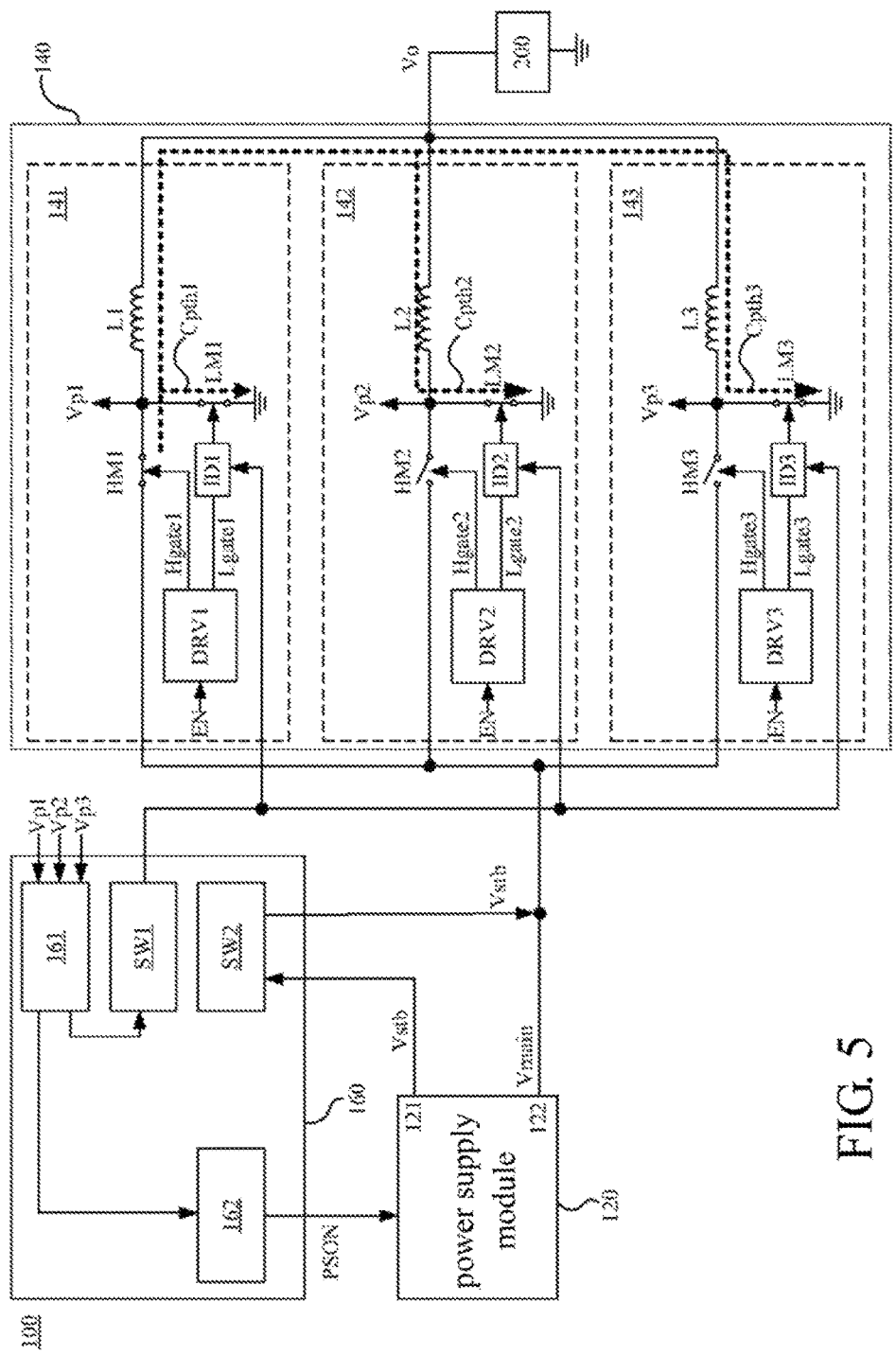
FIG. 5 is a schematic diagram showing a power supply device when one of the high-side power transistors is detected to be abnormal.

Please refer to FIG. 5, which is a schematic diagram showing a power supply device 100 when one of high-side power transistors is abnormal. As shown in FIG. 5, the high-side power transistor HM1 is conducted due to short circuit or in the floating state, and then the three phase low-side power transistors LM1, LM2 and LM3 are conducted and grounded. Therefore, the abnormal voltage (such as the standby voltage Vstb, the main voltage Vmain and other transient over-voltage signals) passed through the high-side power transistor HM1 can be discharged via a discharge path Cpth1 (through the low-side power transistor LM1), a discharge path Cpth2 (through the inductor L1, the inductor L2 and the low-side power transistor LM2) and a discharge path Cpth3 (through the inductor L1, the inductor L3 and the low-side power transistor LM3). The three discharge paths of the voltage regulator module 140 shares the discharge requirements in an abnormal condition.

In the embodiment, the over-voltage protection module 160 determines whether the three phase low-side power transistors LM1, LM2 and LM3 need to be conducted according to whether the detection potentials Vp1~Vp3 deviate from the ground potential, which is not limited herein.

Figure 6:
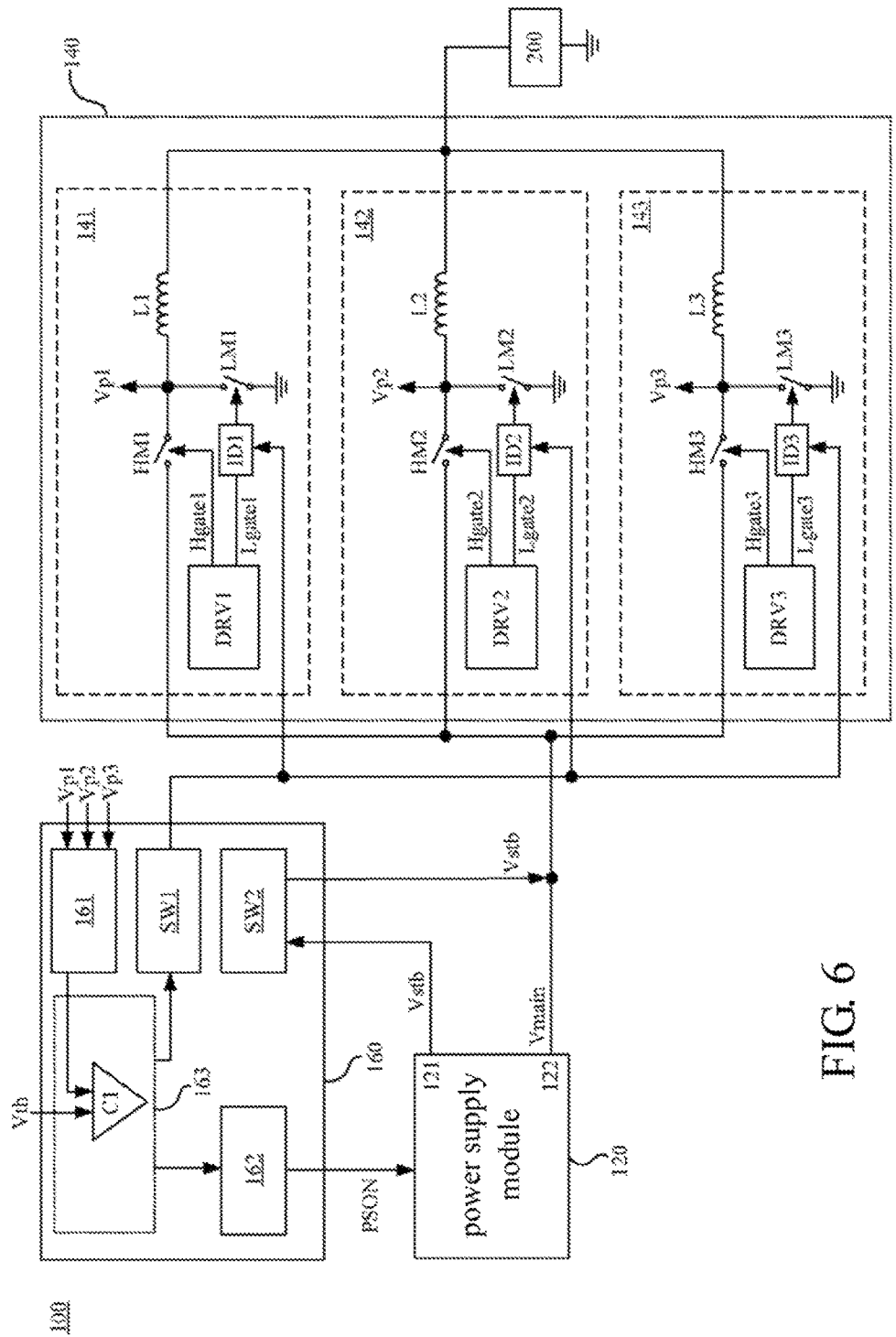
FIG. 6 is a schematic diagram showing a power supply device in an embodiment.

Please refer to FIG. 6, which is a schematic diagram showing a power supply device 100 in an embodiment. The components of the power supply device 100 of FIG. 6 are similar to that of FIG. 1, which can refer to the embodiment in FIG. 1. The difference between the embodiments in FIG. 6 and FIG. 1 is that the over-voltage protection module 160 in FIG. 6 further includes a comparison circuit 163. A comparator C1 of the comparison circuit 163 is utilized to compare the detection potentials Vp1~Vp3 with an over-voltage protection reference potential Vth, respectively. In the embodiment, when the comparator C1 of the detection circuit determines that at least one of the detection potential Vp1~Vp3 exceeds the corresponding over-voltage protection reference potential Vth, the first switch enables the isolation drivers ID1~ID3 to conduct the low-side power transistors LM1~LM3.

In an embodiment, the over-voltage protection reference potential Vth is set as 0.5V or 1V to avoid that the over-voltage protection is triggered by mistake when the detection potentials Vp1~Vp3 increase slightly (deviate from the ground potential) due to a noise signal. That means, in the embodiment, as shown in FIG. 6, the detection potentials Vp1~Vp3 have an admissible range to avoid the oversensitivity of the overvoltage protection.

Figure 7:
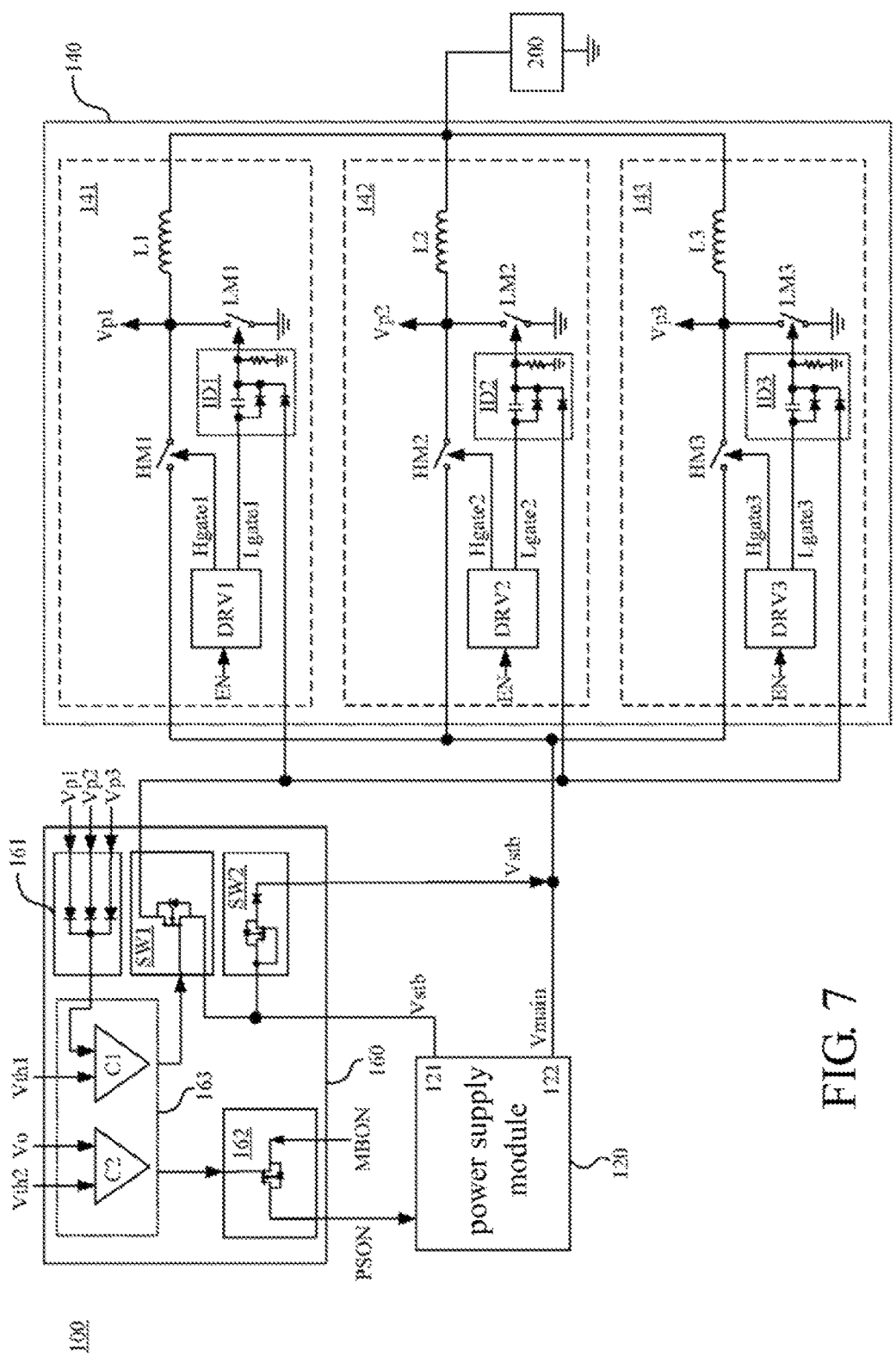
FIG. 7 is a schematic diagram showing a power supply device in an embodiment.

Please refer to FIG. 7, which is a schematic diagram showing a power supply device 100 in an embodiment. The components of the power supply device 100 of FIG. 7 are similar to that of FIG. 1, which can refer to the embodiment in FIG. 1. The difference between the embodiments in FIG. 7 and FIG. 1 is that the over-voltage protection module 160 further includes a comparison circuit 163, and the comparison circuit 163 includes a comparator C1 and a comparator C2.

The comparator C1 is utilized to compare the detection potentials Vp1~Vp3 with a first over-voltage protection reference potential Vth1, respectively. The comparator C2 is utilized to compare an output voltage Vo with a second over-voltage protection reference potential Vth2, respectively.

In the embodiment, when the comparator C1 of the detection circuit determines that at least one of the detection potentials Vp1~Vp3 exceeds the corresponding first over-voltage protection reference potential Vth1, the first switch enables the isolation drivers ID1~ID3 to conduct the low-side power transistors LM1~LM3. The comparator C1 is used for the over-voltage protection between the time point T1 and the time point T4.

After the time point T4, the power supply device 100 establishes the output voltage Vo and provides the output voltage Vo to the load 200. At this time, when one of the high-side power transistors HM1~HM3 is damaged, or one of the high-side power transistors HM1~HM3 has an over voltage, the comparator C1 of the detection circuit determines that at least one of the detection potential Vp1~Vp3 exceeds the corresponding second over-voltage protection reference potential Vth2, and then the isolation drivers ID1~ID3 is enabled via the first switch to conduct the low-side power transistors LM1~LM3. In other words, the comparator C2 is used for the over-voltage protection after the time point T4.

In an embodiment, the first over-voltage protection reference potential Vth1 is set as 0.5V or 1V to avoid that the overvoltage protection is triggered by mistake when the detection potentials Vp1~Vp3 increase slightly (deviate from the ground potential) due to a noise signal. The second over-voltage protection reference potential Vth2 is higher than the first over-voltage protection reference potential Vth1.

As shown in FIG. 7, The over-voltage protection module 160 can take the over-voltage protection (OVP) after the standby voltage Vstb is established (the time point T1) and before the voltage control signal EN is enabled (the time point T4), and the over-voltage protection module 160 also can take the over-voltage protection after the time point T4. In other words, the over-voltage protection can be provided during the initial startup procedure of the power supply device 100 and in the process of the normal operation.

In the embodiments, the components are digital/analog circuits or integrated circuit chips. In an embodiment, the components are integrated at one digital control chip, which is not limited herein. In an embodiment, the first switch, the second switch, the high-side power transistors and the low-side power transistors are the metal oxide semiconductor field effect transistors (MOSFET), or the bipolar junction transistors (BJT), which is not limited herein.

Although the disclosure has been disclosed with reference to certain preferred embodiments thereof, the disclosure is not for limiting the scope. Persons having ordinary skill in the art may make various modifications and changes without departing from the spirit and the scope of the disclosure. Therefore, the scope of the appended claims should not be limited to the description of the preferred embodiments described above.

What is claimed is:

1. A power supply device, comprising:
a power supply module configured to provide a standby voltage;
a voltage regulator module coupled to the power supply module and including a phase modulator circuit, wherein the phase modulator circuit includes:
a high-side power transistor;
a low-side power transistor; and
an inductor, wherein an input terminal of the inductor is coupled to the high-side power transistor and the low-side power transistor, respectively, and an output terminal of the inductor is coupled to a load; and
an over-voltage protection module coupled to the power supply module and the voltage regulator module, including a signal generating unit configured to generate a power on signal to the power supply module, wherein the over-voltage protection module transmits the standby voltage to the phase modulator circuit and detects a detection potential of the inductor, and the low-side power transistor of the phase modulator circuit is selectively conducted by the over-voltage protection module according to the detection potential, the power supply module supplies a main voltage to the voltage regulator module according whether the power on signal is enabled, and the power on signal is disabled by the signal generating unit when the detection potential is not the grounding voltage or exceeds a corresponding over-voltage protection potential.

2. The power supply device according to claim 1, wherein the phase modulator circuit includes a first phase modulator circuit and a second phase modulator circuit, the over-voltage protection module transmits the standby voltage to the first phase modulator circuit and the second phase modulator circuit, respectively, and detects a plurality of detection potentials of the inductors, and the low-side power transistors of the first phase modulator circuit and/or the second phase modulator circuit are selectively conducted by the over-voltage protection module according to the detection potentials.

3. The power supply device according to claim 1, wherein the phase modulator circuit further includes:
a switch driver configured to generate a high-side gate signal to the high-side power transistor and to generate a low-side gate signal to the low-side power transistor.

4. The power supply device according to claim 3, wherein the phase modulator circuit further includes:
an isolation driver coupled to the switch driver and the low-side power transistor, wherein the low-side power transistor is conducted by the isolation drivers when the detection potential is not the grounding voltage or exceeds a corresponding over-voltage protection potential.

5. The power supply device according to claim 4, wherein the over-voltage protection module further includes:
a detection circuit configured to detect the detection potentials of the inductors; and
a first switch coupled to the detection circuit and the isolation driver, wherein the first switch enables the isolation drivers to conduct the low-side power transistors when the detection circuit detects the detection potential is not the grounding voltage.

6. The power supply device according to claim 4, wherein the over-voltage protection module further includes:
a detection circuit configured to detect the detection potential of the inductor;
a comparison circuit configured to compare the detection potential with an over-voltage protection reference potential; and
a first switch coupled to the detection circuit and the isolation driver, wherein the first switch enables the isolation driver to conduct the low-side power transistors when the detection circuit detects that the detection potential exceeds the corresponding over-voltage protection potential.

7. The power supply device according to claim 1, wherein the high-side power transistor includes a first terminal and a second terminal, the first terminal of the high-side power transistor is coupled to a main voltage output terminal of the power supply module, and a second terminal of the high-side power transistor is coupled to an input terminal of an inductor; and
the low-side power transistor includes a first terminal and a second terminal, the first terminal of the low-side power transistor is coupled to the second terminal of the high-side power transistor and the input terminal of the inductor, and the second terminal of the low-side power transistor is coupled to a ground terminal.

8. The power supply device according to claim 7, wherein the over-voltage protection module further includes:

a second switch coupled to a standby voltage output terminal of the power supply module and the first terminal of the high-side power transistor, wherein the second switch transmits the standby voltage to the first terminal of high-side power transistors to detect whether the high-side power transistors are short circuited or are in a floating state.

9. The power supply device according to claim 8, wherein when the high-side power transistor is short circuited or is in the floating state, the standby voltage passes through the high-side power transistor and the detection potential is generated at the corresponding inductor.

\* \* \* \* \*